US009532549B2

(12) United States Patent
Rose et al.

(10) Patent No.: US 9,532,549 B2
(45) Date of Patent: Jan. 3, 2017

(54) DEVICES AND SYSTEMS FOR LIMITING FEED VOLUME DISPOSED INTO A PLURALITY OF TANDEM FEED BOOT UNLOADERS INTO A FEED PATH(S), AND RELATED METHODS

(71) Applicant: Hog Slat, Inc., Newton Grove, NC (US)

(72) Inventors: Joe Mark Rose, Newton Grove, NC (US); Tyler Clay Marion, Raleigh, NC (US)

(73) Assignee: HOG SLAT INC., Newton Grove, NC (US)

( * ) Notice: Subject to any disclaimer, the term of this patent is extended or adjusted under 35 U.S.C. 154(b) by 16 days.

(21) Appl. No.: 14/202,315

(22) Filed: Mar. 10, 2014

(65) Prior Publication Data

US 2014/0261199 A1    Sep. 18, 2014

Related U.S. Application Data

(60) Provisional application No. 61/783,077, filed on Mar. 14, 2013.

(51) Int. Cl.
*A01K 5/00*    (2006.01)
*A01K 5/02*    (2006.01)

(52) U.S. Cl.
CPC .............. *A01K 5/0258* (2013.01); *A01K 5/02* (2013.01)

(58) Field of Classification Search
CPC ...... A01K 5/00; A01K 5/0258; A01K 5/0275; A01K 5/02; A01K 39/0125
See application file for complete search history.

(56) References Cited

U.S. PATENT DOCUMENTS

| | | | |
|---|---|---|---|
| 2,830,695 A | | 4/1958 | Fennimore et al. |
| 3,278,001 A | | 10/1966 | Andrews |
| 3,585,970 A | * | 6/1971 | Scott ................. A01K 39/0125 119/53 |
| 3,949,863 A | | 4/1976 | Lippi |
| 4,016,970 A | | 4/1977 | Wert |
| 4,352,426 A | | 10/1982 | Peterson, Jr. |
| 4,495,894 A | | 1/1985 | Swartzendruber |
| 4,676,197 A | | 6/1987 | Hoover |
| 4,722,301 A | * | 2/1988 | Strong ............... A01K 39/0125 119/51.11 |
| 4,815,417 A | | 3/1989 | Strong |

(Continued)

*Primary Examiner* — Trinh Nguyen
(74) *Attorney, Agent, or Firm* — Withrow & Terranova, PLLC (57) ABSTRACT

Devices and systems for limiting feed volume dispensed into a plurality of tandem feed boot unloaders into one or more feed paths and related methods are disclosed. A core system is provided that are disposed in the feed path through each of the tandem feed boot unloaders in a center portion of an auger supported by a bearing assembly. Feed housings are configured to direct feed into the boot unloaders and into the auger. The feed is moved by the auger as a result of rotation of the auger about the bearing assembly. The core system provided herein limits and regulates the amount of feed that can enter each boot unloader by occupying space within a center portion of the auger that passes through each boot unloader, thus making it less likely that the auger will become clogged and be constrained from moving feed in the feed path.

15 Claims, 8 Drawing Sheets

(56) References Cited

U.S. PATENT DOCUMENTS

| | | | |
|---|---|---|---|
| 5,697,327 A * | 12/1997 | Pollock | A01K 5/0258 |
| | | | 119/57.4 |
| 5,782,201 A | 7/1998 | Wells | |
| 5,875,882 A | 3/1999 | Pollock | |
| 6,182,869 B1 | 2/2001 | Birky | |
| 6,250,252 B1 | 6/2001 | Peich | |
| 2011/0253461 A1 | 10/2011 | Jaeger | |

* cited by examiner

DEVICES AND SYSTEMS FOR LIMITING FEED VOLUME DISPOSED INTO A PLURALITY OF TANDEM FEED BOOT UNLOADERS INTO A FEED PATH(S), AND RELATED METHODS

PRIORITY APPLICATION

The present application claims priority to U.S. Patent Application Ser. No. 61/783,077 entitled "Devices And Systems For Limiting Feed Volume Disposed Into A Plurality Of Tandem Feed Boot Unloaders Into A Feed Path(s), And Related Methods," filed on Mar. 14, 2013, which is hereby incorporated herein by reference in its entirety.

FIELD OF DISCLOSURE

The technology of the disclosure relates to limiting feed volume from a plurality of boot unloaders into one or more feed paths.

BACKGROUND

Livestock feed systems allow for large scale, simultaneous delivery of livestock feed from a central storage container to multiple animals, which may be housed in separate enclosures and buildings at a farm or other livestock management facility. Some conventional systems use an auger disposed in a feed path to move feed along the feed path toward one or more outlets. An auger can provide consistent and steady delivery of feed to livestock in a plurality of locations across a barn or other livestock facility.

Figure 1:
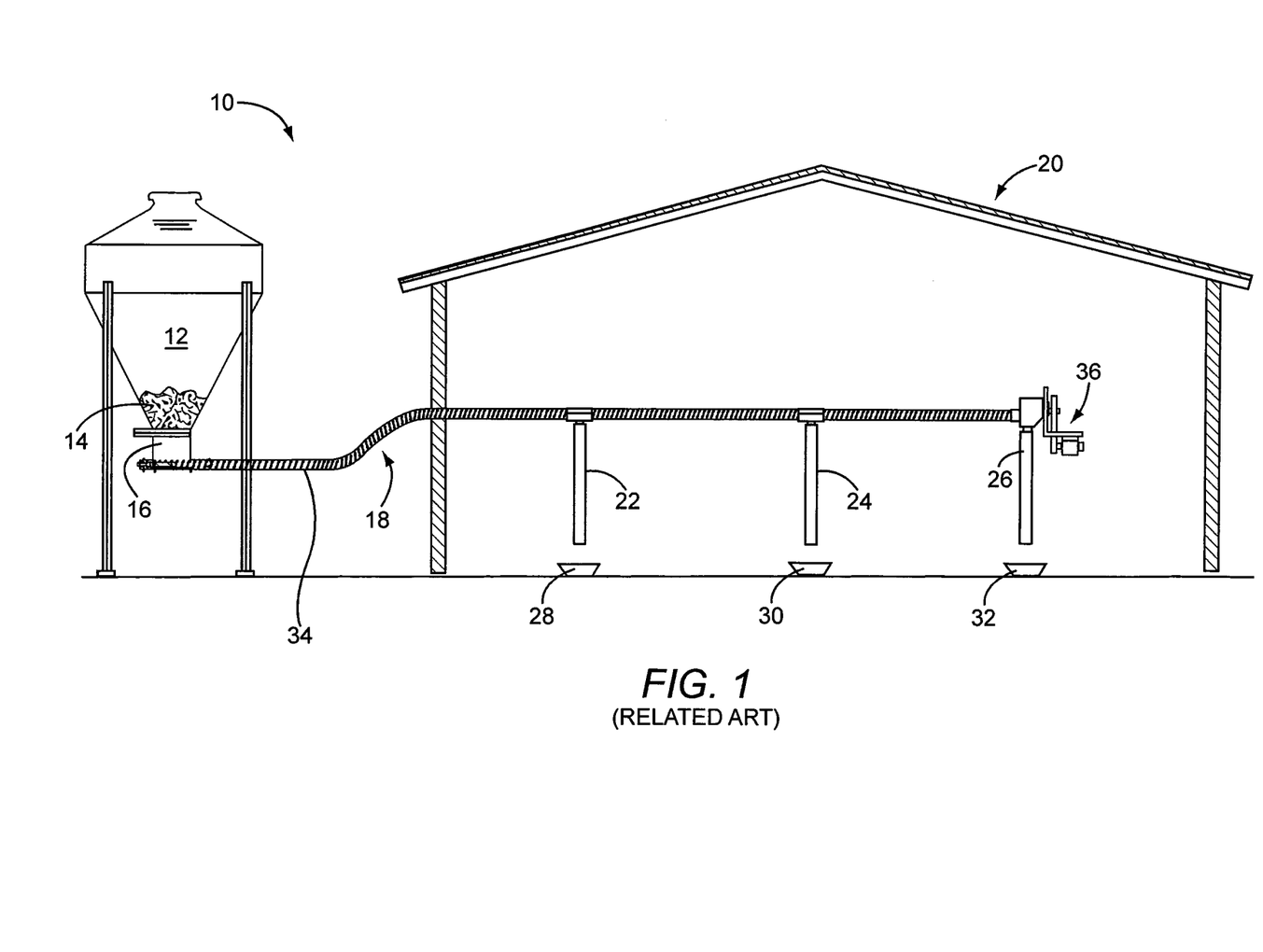
FIG. 1 illustrates a conventional feed system.

In this regard, a conventional livestock feed system 10 is illustrated in FIG. 1. A feed housing 12 stores a quantity of feed 14. The feed 14 is fed by gravity into a boot unloader 16 located at an end of a feed path 18. The feed path 18 extends into a building 20, such as a barn, and further into a plurality of feed outlets 22, 24, 26. Each of the plurality of feed outlets 22, 24, 26 then channels the feed 14 out of the feed path 18 and into one or more feed receptacles 28, 30, 32. A flexible auger 34 is disposed along the length of the feed path 18 and connects to a drive mechanism, such as an electric motor 36. The motor 36 rotates the auger 34 (clockwise in this example) such that a continuous coiled edge of the auger 34 moves feed along the feed path 18 from the boot unloader 16 to the feed outlets 22, 24, 26.

The conventional feed system 10 of FIG. 1 has a number of drawbacks. First, the conventional feed system 10 of FIG. 1 is only configured to accommodate a single feed boot unloader 16 located at the end of the feed path 18. Second, feed 14 tends to flow too quickly from the boot unloader 16 into the feed path 18, causing the feed path 16 to clog and jam in a number of different ways. For example, the feed 14 can become compressed inside and around the auger 34 so that the auger 34 is unable to rotate, thereby preventing the feed 14 from being moved forward along the feed path 18. An excess amount of feed 14 can also form a stationary blockage within the auger 34, which adheres to and rotates in place with the auger 34, thereby preventing additional feed 14 from being moved past the blockage toward the feed outlets 22, 24, 26. This problem is exacerbated when multiple boot unloaders are arranged in tandem along the feed path, because feed potentially flows into each downstream boot unloader from the respective housing as well as from the upstream feed path. Thus, when multiple boot unloaders are arranged in tandem along the feed path, each boot unloader has the potential to independently cause a blockage that prevents the entire feed system from operating. These and other drawbacks increase downtime of the feed system, and produce added expense for cleaning, unclogging, maintenance and repair.

SUMMARY OF THE DISCLOSURE

Embodiments disclosed herein are directed to devices and systems for limiting feed volume dispensed into a plurality of tandem feed boot unloaders into one or more feed paths and related methods. A core system is provided that is disposed in the feed path through each of the tandem feed boot unloaders in a center portion of an auger supported by a bearing assembly. Feed housings are configured to direct feed into the boot unloaders and into the auger. The feed is moved by the auger as a result of rotation of the auger about the bearing assembly. The core system provided herein limits and regulates the amount of feed that can enter each boot unloader by occupying space within a center portion of the auger that passes through each boot unloader, thus making it less likely that the auger will become clogged. Such clogging can prevent the auger from rotating, or can form a stationary blockage in the auger and prevent feed from moving past the blockage, thereby constraining the auger from moving feed in the feed path. Accordingly, by preventing clogging of the auger at each of the boot unloaders along the feed path, the core system can reduce downtime of the entire feed system.

In this regard in one embodiment, an exemplary livestock feed system is provided. The livestock feed system comprises a feed path extending between an end bearing and at least one feed outlet. The livestock feed system also comprises a first feed boot unloader disposed in the feed path between the end bearing and the at least one feed outlet. The first feed boot unloader is configured to receive first feed from a first feed housing into the feed path. The livestock feed system also comprises a second feed boot unloader disposed in the feed path between the first feed boot unloader and the at least one feed outlet. The second feed boot unloader is configured to receive second feed from a second feed housing into the feed path. The livestock feed system also comprises an auger extending continuously in the feed path between the first feed boot unloader and the at least one feed outlet. The auger is configured to be rotated to move the first and second feed in the feed path toward the at least one feed outlet. The livestock feed system also comprises a core system. The core system is disposed within the auger substantially along an axis of rotation of the auger. The core system extends along the feed path through at least the first feed boot unloader and the second feed boot unloader, thus limiting the amount of first and second feed received into the feed path and making it less likely the auger will become clogged and be constrained from moving feed in the feed path.

In another embodiment, a method of operating the livestock feed system is provided. The method comprises providing the livestock feed system, comprising a feed path extending between an end bearing and at least one feed outlet. The providing the livestock feed system further comprises a first feed boot unloader disposed in the feed path between the end bearing and the at least one feed outlet. The first feed boot unloader is configured to receive first feed from a first feed housing into the feed path. The providing the livestock feed system further comprises a second feed boot unloader disposed in the feed path between the first feed boot unloader and the at least one feed outlet. The second feed boot unloader is configured to receive second feed from a second feed housing into the feed path. The providing the livestock feed system further comprises an auger extending continuously in the feed path between the first feed boot unloader and the at least one feed outlet. The auger is configured to be rotated to move the first feed in the feed path toward the at least one feed outlet and move the second feed in the feed path toward the at least one feed outlet. The providing the livestock feed system further comprises a core system disposed within the auger substantially along an axis of rotation of the auger through at least the first feed boot unloader in the path and the second feed boot unloader in the feed path. The core system is configured to limit an amount of the first feed received into the feed path and to limit an amount of the second feed received into the feed path. The method of operating the livestock feed system further comprises providing the first feed from the first feed housing into the first feed boot unloader and rotating the auger to move the first feed from the first feed housing through the feed path to the at least one feed outlet.

In yet another embodiment, a method of operating the livestock feed system is provided. The method comprises providing the livestock feed system comprising a feed path extending between an end bearing and at least one feed outlet. The providing the livestock feed system further comprises a first feed boot unloader disposed in the feed path between the end bearing and the at least one feed outlet. The first feed boot unloader is configured to receive first feed from a first feed housing into the feed path. The providing the livestock feed system further comprises a second feed boot unloader disposed in the feed path between the first feed boot unloader and the at least one feed outlet. The second feed boot unloader is configured to receive second feed from a second feed housing into the feed path. The providing the livestock feed system further comprises an auger extending continuously in the feed path between the first feed boot unloader and the at least one feed outlet. The auger is configured to be rotated to move the first feed in the feed path toward the at least one feed outlet and move the second feed in the feed path toward the at least one feed outlet. The providing the livestock feed system further comprises a core system disposed with the auger substantially along an axis of rotation of the auger through at least the first feed boot unloader in the feed path and the second feed boot unloader in the feed path. The core system is configured to limit the amount of the first feed received into the feed path and to limit an amount of the second feed received into the feed path. The method further comprises providing the second feed from the second feed housing into the second feed boot unloader, and rotating the auger to move the second feed from the second feed housing through the feed path to the at least one feed outlet.

The core system may comprise a single continuous core extending through the first feed boot unloader and the second feed boot unloader. The core system can also include a first core extending through the first feed boot unloader, and a second core extending through the second feed boot unloader. In one example, the first core terminates a first distance beyond the first feed boot unloader in the feed path, and the second core terminates a second distance beyond the second feed boot unloader in the feed path. The core system may be comprised of a flexible material, such as a plastic, and/or a non-flexible material, such as a metal.

The livestock feed system may further comprise a second feed path, a second end bearing, at least one second feed outlet, a second auger, and a second core system arranged in a manner similar to the feed path, the end bearing, the at least one feed outlet, the auger, and the core system discussed above. The second auger can extend along the second feed path between the first feed boot unloader and the at least one second feed outlet.

The second core system may be parallel to the first core system. In another embodiment, the portion of the first core system that is disposed in the first boot unloader is parallel to the portion of the second core system that is disposed in the first boot unloader. Likewise, in this embodiment, the portion of the first core system that is disposed in the second boot unloader is parallel to the portion of the second core system that is disposed in the second boot unloader.

The livestock feed system may further comprise a motor. The motor can be configured to rotate the auger to move the first feed in the feed path toward the at least one feed outlet and move the second feed in the feed path toward the at least one feed outlet.

The livestock feed system can also include at least one sensor associated with the at least one feed outlet. The at least one sensor can be configured to detect a low feed condition with respect to at least one feed receptacle associated with the at least one feed outlet, and to activate the motor in response to detecting the low feed condition.

In some embodiments, methods of using an exemplary livestock feed system is described. In an exemplary embodiment, feed is provided from the first feed housing into the first feed boot unloader and the auger is rotated, for example, by a motor, to move the first feed from the first feed housing through the feed path to the at least one feed outlet.

In another exemplary embodiment, feed is provided from the second feed housing into the second feed boot unloader. The auger is rotated to move the first feed from the first feed housing through the feed path to the at least one feed outlet.

It is to be understood that both the foregoing general description and the following detailed description present embodiments, and are intended to provide an overview or framework for understanding the nature and character of the disclosure. The accompanying drawings are included to provide a further understanding, and are incorporated into and constitute a part of this specification. The drawings illustrate various embodiments, and together with the description serve to explain the principles and operation of the concepts disclosed.

DETAILED DESCRIPTION

Embodiments disclosed herein are directed to devices and systems for limiting feed volume dispensed into a plurality of tandem feed boot unloaders into one or more feed paths and related methods. A core system is provided that is disposed in the feed path through each of the tandem feed boot unloaders in a center portion of an auger supported by a bearing assembly. Feed housings are configured to direct feed into the boot unloaders and into the auger. The feed is moved by the auger as a result of rotation of the auger about the bearing assembly. The core system provided herein limits and regulates the amount of feed that can enter each boot unloader by occupying space within a center portion of the auger that passes through each boot unloader, thus making it less likely that the auger will become clogged. Such clogging can prevent the auger from rotating, or can form a stationary blockage in the auger and prevent feed from moving past the blockage, thereby constraining the auger from moving feed in the feed path. Accordingly, by preventing clogging of the auger at each of the boot unloaders along the feed path, the core system can reduce downtime of the entire feed system.

Figure 2:
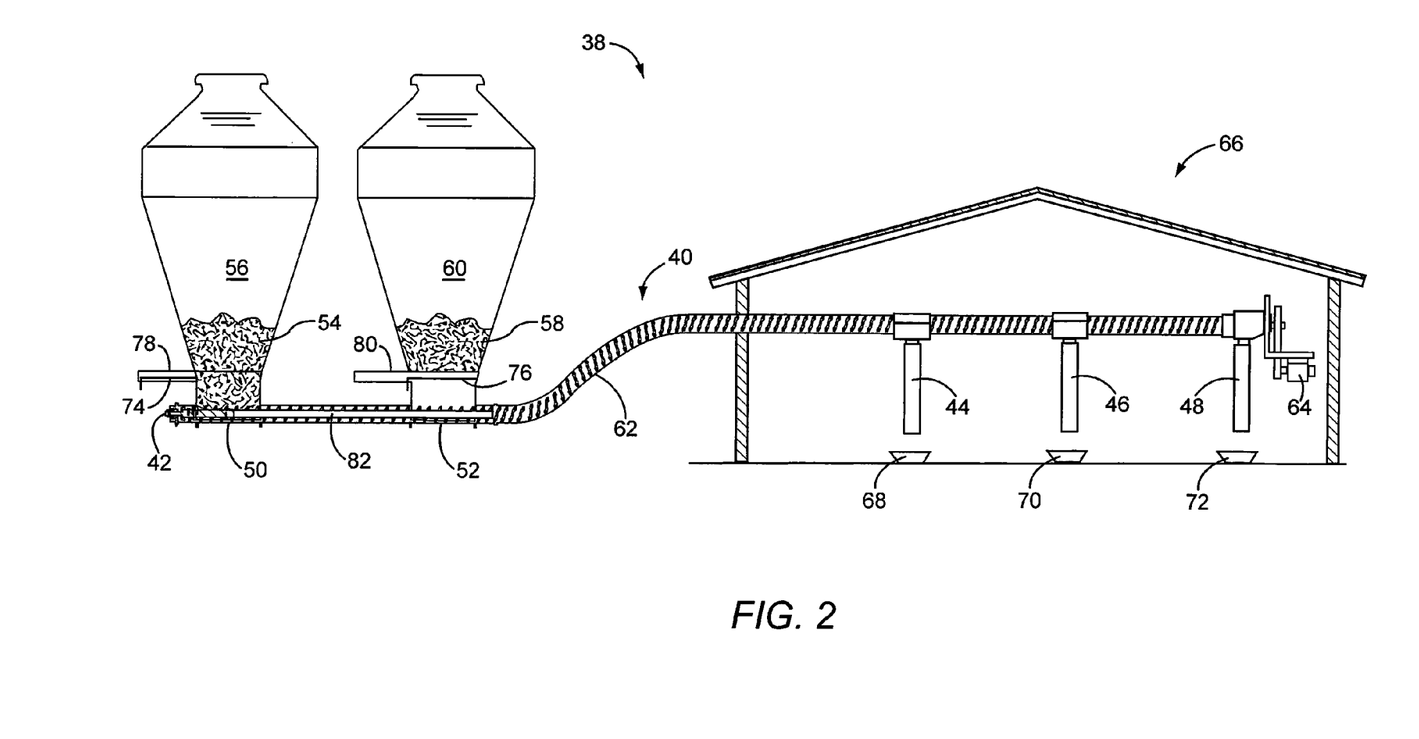
FIG. 2 illustrates a feed system according to an exemplary embodiment.

In this regard, FIG. 2 illustrates an exemplary feed system 38 that includes devices and systems for limiting feed volume disposed into a plurality of tandem feed boot unloaders provided in one or more feed paths. A feed path 40 extends between an end bearing 42 and at least one feed outlet, such as feed outlets 44, 46, 48. First and second boot unloaders 50, 52 are disposed in the feed path 40 in tandem between the end bearing 42 and the feed outlets 44, 46, 48. Each of the first and second boot unloaders 50, 52 is configured to receive first and second feed 54, 58 from associated first and second feed housings 56, 60, and to move the first and second feed 54, 58 into the feed path 40. In this embodiment, a first feed boot unloader 50 is disposed proximate to the end bearing 42, and a second feed boot unloader 52 is disposed in-line with the feed path 40 downstream of the first feed boot unloader 50.

One advantage of arranging the first and second boot unloaders 50, 52 in tandem along the same feed path 40 is that multiple feed housings (e.g., first and second feed housings 56, 60) can be connected to a single feed path 40. This allows one or more feed housings to be refilled, serviced, replaced or otherwise taken in and out of service without interrupting the flow of feed from one or more other feed housings along the feed path 40. However, because the second boot unloader 52 is arranged in tandem with the first boot unloader 50, such that both the first feed 54 and second feed 58 flow through the second boot unloader 52 along the feed path 40, there is a need for a system that prevents clogs and jams along the entire feed path 40, and in particular at the first and second boot unloaders 50, 52.

In this embodiment, an auger 62 extends along the entire feed path 40. The auger 62 may be defined as a helical screw, vane or blade that rotates about an axis within a stationary duct or trough, such as feed path 40. The auger 62 is connected at one end to the end bearing 42 and at the other end to a drive assembly 64, which is arranged to rotate the auger 62 within the feed path 40. In this embodiment, the drive assembly 64 is a belt drive motor and the auger 62 is a centerless auger and, thus, lacks an integral core and/or shaft. One advantage of using a centerless auger is that the auger 62 can bend along the feed path 40 without permanently deforming and is able to be rotated even if the feed path 40 is not perfectly straight.

When the auger 62 is rotated by the drive assembly 64, the auger 62 moves the first and second feed 54, 58 along the feed path 40 away from the first and second boot unloaders 50, 52 and toward the feed outlets 44, 46, 48, which are located inside a building 66. Each feed outlet 44, 46, 48 guides the first and second feed 54, 58 into respective feed receptacles 68, 70, 72 (as a non-limiting example, a feed trough). As the first and second feed 54, 58 is moved away from the first and second boot unloaders 50, 52, additional first and second feed 54, 58 can then drop from the associated first and second feed housing 56, 60 into the first and second boot unloaders 50, 52 and into the feed path 40. The first and second boot unloaders 50, 52 can be manually opened and closed, for example, by opening and closing feed doors 74, 76 (shown as part of sliding feed door assemblies 78, 80 in this embodiment), to regulate whether additional first and second feed 54, 58 in the first and second feed housings 56, 60 drops into the first and second boot unloaders 50, 52 and into the feed path 40. In the configuration illustrated in FIG. 2, the feed door 74 of the first boot unloader 50 is open to allow the first feed 54 to flow into the feed path 40 and the feed door 76 of the second boot unloader 52 is closed to halt the flow of the second feed 56 into the feed path 40.

In this embodiment, boot unloaders 50, 52 are disposed in tandem along the feed path 40. Thus, the first feed 54 from the first (upstream) boot unloader 50 passes through the second (downstream) boot unloader 52, en route to the feed outlets 44, 46, 48. As discussed above, it is possible to load the first feed 54 and the second feed 58 into the feed path 40 simultaneously. In practice, however, feed is generally introduced into the feed path 40 from only one feed housing 56, 60 at a time.

Feed in conventional systems, such as the conventional livestock feed system 10 of FIG. 1, employing centerless augers such as the auger 34 of FIG. 1, allow feed to be disposed in center portions of the auger 62 in the first and second boot unloaders 50, 52. The auger 62 may be clogged with feed 54, 58 as a result, thereby constraining the auger 62 from moving the feed 54, 58 in the feed path 40. To address these drawbacks, a core system 82 is disposed within the auger 62 between the end bearing 42 and a boot unloader that is farthest downstream in the feed path 40, the second boot unloader 52 in this example in FIG. 2. The core system 82 connects to the end bearing 42 and an upstream end of the auger 62. In this embodiment, the core system 82 rotates with the auger 62. However, in other embodiments, the core system 82 may be stationary and permit the auger 62 to rotate freely about the core system 82.

In this embodiment, the core system 82 limits and regulates the amount of the first and second feed 54, 58 that can be accepted into the first and second boot unloaders 50, 52 at one time. Consequently, the core system 82 regulates and limits the amount of the first and second feed 54, 58 that is accepted into the feed path 40. In this embodiment, the core system 82 extends from the end bearing 42 to the farthest downstream boot unloader, which in this example is the second boot unloader 52. Once the first and second feed 54, 58 passes beyond the core system 82 and past the second boot unloader 52, the first and second feed 54, 58 can then travel smoothly down the remainder of the feed path 40. Because the auger 62 is a centerless auger, there is sufficient space around the auger 62 in the portion of the feed path 40 downstream of the core system 82. Thus, the chance of a clog or jam occurring from an excessive amount of the first and second feed 54, 58 is reduced. Details of the core system 82 and alternate embodiments thereof will be described in greater detail below with respect to FIGS. 3-6C.

Figure 3:
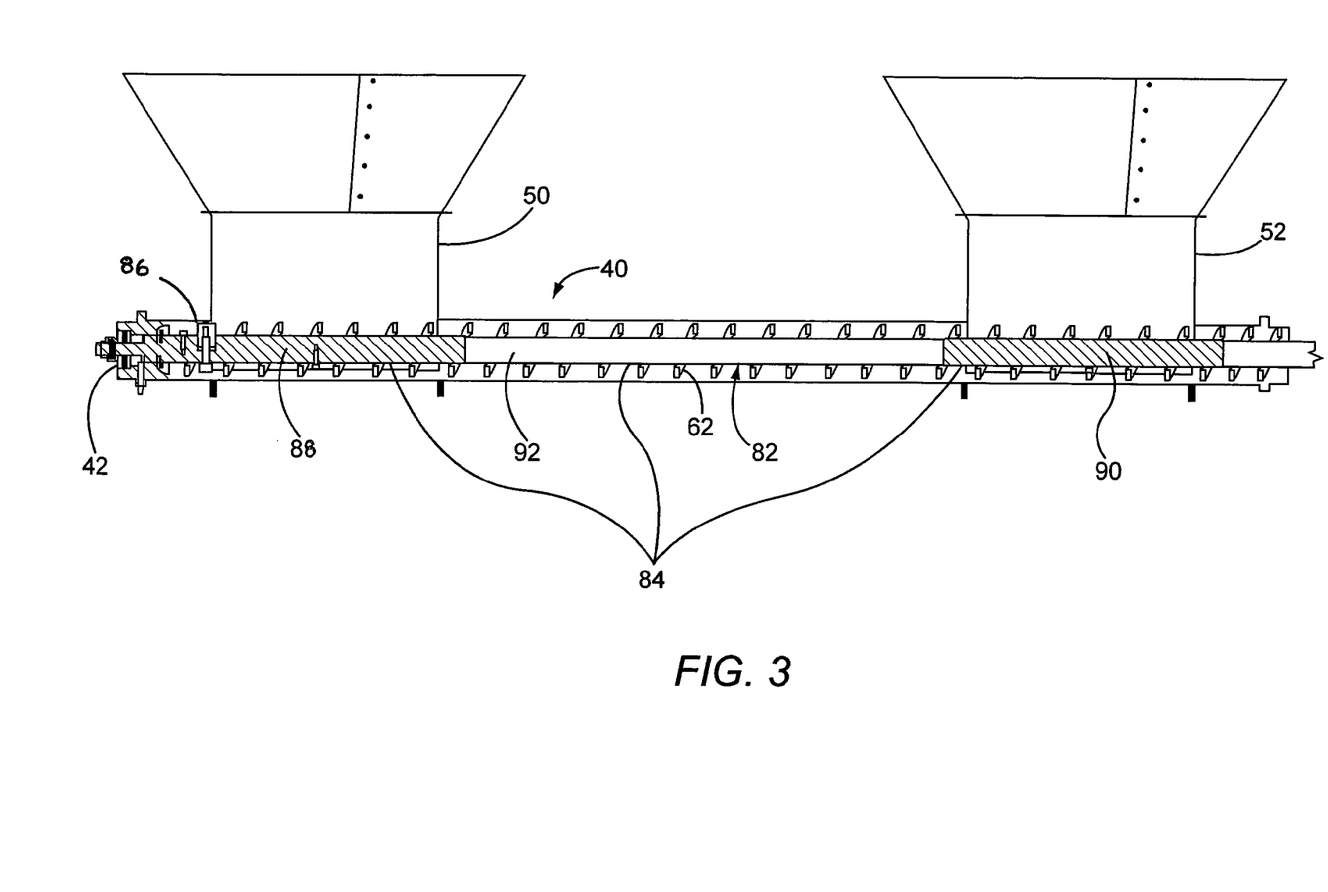
FIG. 3 illustrates a detailed view of a portion of the feed system of FIG. 2.

FIG. 3 illustrates a detailed view of a portion of the feed system 38 of FIG. 2. In this embodiment, the core system 82 includes a single, continuous core 84 that extends through the first boot unloader 50 and the second boot unloader 52.

One end of the continuous core 84 is secured by the end bearing 42 and the other end extends a predetermined distance beyond the second boot unloader 52, such that the flow of the first and second feed 54, 58 into the feed path 40 is limited and regulated by the core system 82. Using this arrangement, the feed path 40 is less likely to become clogged or jammed with feed 54, 58 in the first and second boot unloaders 50, 52. The core system 82 is not required to be provided in the auger 62 beyond the second boot unloader 52 in the feed path 40, because the flow rate of feed has already been limited by the core system 82 coming into the first and second boot unloaders 50, 52. In addition, by limiting the amount of feed 54, 58 that can enter the boot unloaders 50, 52 at one time, the chance of the feed becoming overly compressed and forming a solid obstruction within the boot unloaders 50, 52 feed path 40 may be reduced. In this embodiment, the auger 62 is secured to the continuous core 84 by an auger lock 86, discussed in more detail below with respect to FIGS. 6A-6C. Further, in this embodiment, the continuous core 84 is comprised of three sections: a first core section 88, a second core section 90, and an intermediate core section 92 disposed therebetween.

The first core section 88 securely engages with the end bearing 42 and extends into the first boot unloader 50. In other embodiments, the first core section 88 may extend entirely through the first boot unloader 50. In this embodiment, the first core section 88 is formed from a rigid material, such as metal. In a preferred embodiment, the rigid material is a non-corrosive metal, such as brass or stainless steel, although other suitable materials may be used as well. In this embodiment, the end of the auger 62 is secured to the first core section 88. The rigid construction of the first core section 88 permits the first core section 88 to more securely engage with the end bearing 42 without compromising an ability of the first core section 88 to rotate freely. The rigid construction of the first core section 88 also permits the end of the auger 62 to be more securely attached to the first core section 88 via the auger lock 86, which in turn permits the auger 62 to rotate the first core section 88 smoothly and effectively, thereby preventing excess bending and twisting of the auger 62 within the feed path 40.

In this embodiment, the second core section 90 is located proximate to the second boot unloader 52 and extends entirely through the second boot unloader 52. In other embodiments, the second core section 90 extends only partially through the second boot unloader 52. Similarly to the first core section 88, the second core section 90 may be formed from a rigid material. Although not required by this embodiment, the auger 62 may be secured directly to the second core section 90 to prevent longitudinal movement of the second core section 90.

In this embodiment, the intermediate core section 92 extends between and is connected to each of the first and second core sections 88, 90. The intermediate core section 92 is arranged to transmit rotational force between the first and second core sections 88, 90, such that rotating one of the first core section 88, the second core section 90, or the intermediate core section 92 causes the entire core system 82 to rotate. In this embodiment, the intermediate core section 92 is formed from a flexible or semi-flexible material, such as thermoplastic or nylon. By forming the intermediate core section 92 from a flexible or semi-flexible material, the intermediate core system 92 is not required to be straight within the feed path 40 to be able to rotate with the rigid first and second core sections 88, 90.

Another advantage of the above described arrangement is that the first and second boot unloaders 50, 52 do not need to be precisely aligned prior to installation. Because the auger 62 and intermediate core section 92 can be flexible, a portion of the feed path 40 extending between the first and second boot unloaders 50, 52 does not need to be perfectly straight to nevertheless permit the intermediate core section 92 and the auger 62 to rotate. In general, feed boot unloaders and feed housings can be heavy and unwieldy, and often require permanent or semi-permanent installation. Accordingly, it can be very difficult and costly to install and/or realign boot unloaders such that the feed path is sufficiently straight to accommodate a continuous, rigid core system extending therethrough. On the other hand, it is comparatively inexpensive to install and/or modify a feed path between already installed boot unloaders such that feed, an auger and a flexible intermediate core section can be extended therethrough, allowing the auger and flexible intermediate core section to freely rotate in the feed path to move feed toward feed outlets.

In another embodiment, the single, continuous core 84 is formed from a single, unitary rigid core section (not shown) that extends from the end bearing 42 to a distance past the second boot unloader 52. Although it may be more difficult to align the first and second boot unloaders 50, 52 and the feed path 40 to accommodate a unitary rigid core section, one advantage of this arrangement is that the unitary rigid core section will be comparatively stronger and more resilient than the above described core system 82 having a flexible intermediate core section 92.

Figure 4:
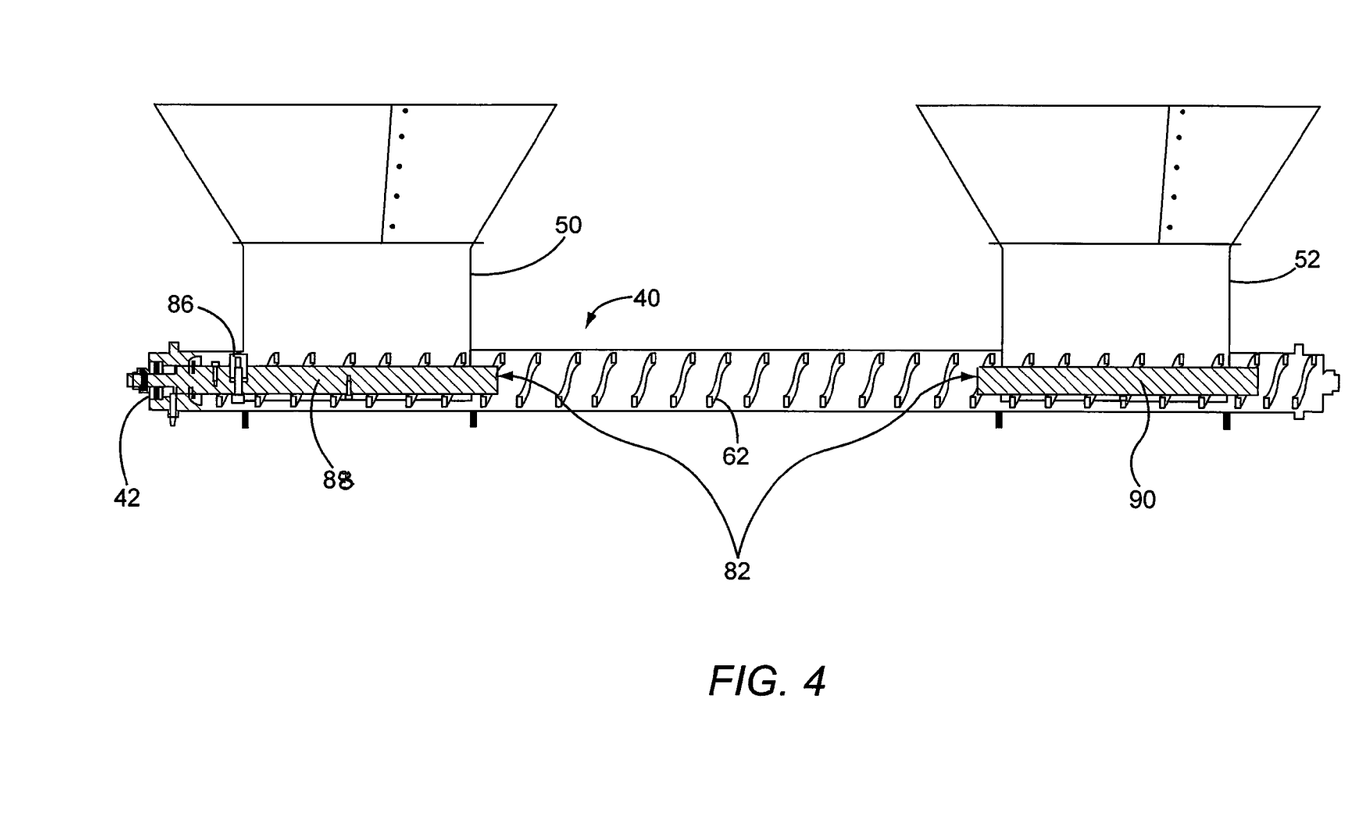
FIG. 4 illustrates a portion of the feed system of FIG. 2 according to an alternate embodiment.

FIG. 4 illustrates a portion of the feed system 38 of FIG. 2 according to an alternate embodiment. The core system 82 of the embodiment illustrated in FIG. 4 includes the first and second core sections 88, 90, as described in detail with respect to FIG. 3. However, in this embodiment, the core system 82 does not include the intermediate core section 92. Instead, the first core section 88 is secured with respect to the end bearing 42 and connected to the auger 62 in a manner similar to the embodiment of FIG. 3. For example, the second core section 90 may be secured to the auger 62 directly by welding, clamping (e.g., via an auger lock, similar to the auger lock 86 of FIG. 3), or another suitable method. In this embodiment, the portion of the feed path 40 between the first and second core sections 88, 90 contains the auger 62 only, such that the first and second feed 54, 58 that is input into the first boot unloader 50 is moved by the auger 62 toward the second core section 90 in the second boot unloader 52. The flow rate of the first and second feed 54, 58 is regulated by the second core section 90, such that the flow rate of the first and second feed 54, 58 through the second boot unloader 52 is limited by the second core section 90 to substantially the same rate that is permitted through the first boot unloader 50.

It should be noted that omitting the intermediate core section 92 may introduce the possibility of a jam or clog of feed 54, 58 into the feed path 40 as the first and second feed 54, 58 approaches the second core section 90. However, in this embodiment, the first core section 88 and the second core section 90 have substantially equal cross-sectional areas that permit substantially the same amount of the first and second feed 54, 58 to pass through the first and second boot unloaders 50, 52. Therefore, the first core section 88 in the first boot unloader 50 reduces the risk of a jam or clog at a subsequent core section, such as the second core section 90. This is because the flow rate of the first and second feed 54, 58 introduced into the feed path 40 at the first boot unloader 50 is limited by the first core section 88 to substantially the same flow rate that is permitted by the second core section 90.

Figure 5A:
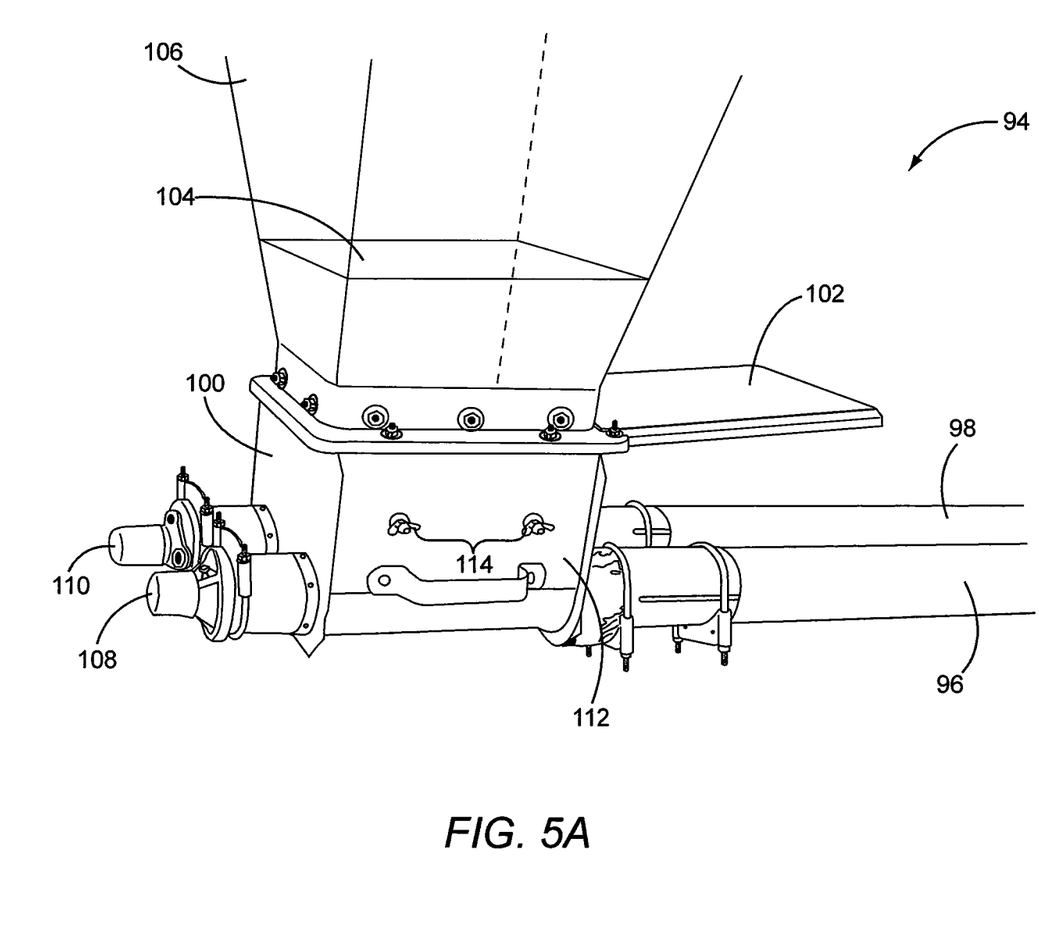
FIG. 5A illustrates a portion of a feed system according to an alternate embodiment.
Figure 5B:
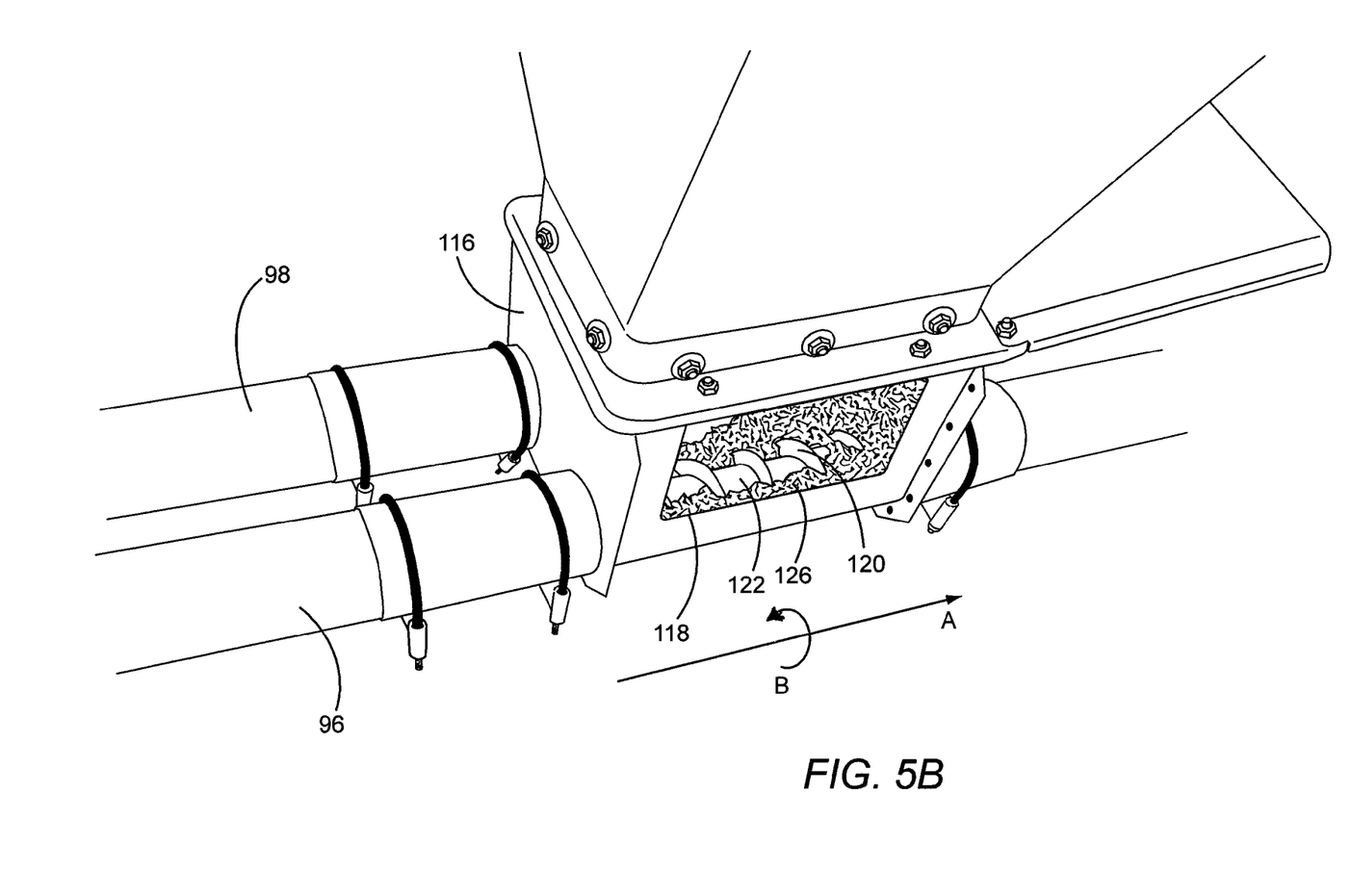
FIG. 5B illustrates a portion of a feed system according to an alternate embodiment.

FIGS. 5A and 5B illustrate a portion of a dual feed path livestock feed system 94 according to an alternate embodiment. In this embodiment, feed system 94 includes two feed paths 96, 98. FIG. 5A illustrates the first boot unloader 100, which has many of the same features as the first boot unloader 50 illustrated in FIG. 2. However, in this embodiment, two feed paths 96, 98 pass through the first boot unloader 100 in parallel. A feed door assembly 102 is shown in the open position, which permits first feed 104 to flow from a first feed housing 106 into the first boot unloader 100. To stop the flow of the first feed 104, the feed door assembly 102 can be slid horizontally into the closed position. Two parallel feed paths 96, 98 extend through the first boot unloader 100, each terminating at respective end bearings 108, 110 at one end of the first boot unloader 100 and extending toward at least one feed outlet (not shown) from the other end of the first boot unloader 100. The first boot unloader 100 in this embodiment also includes an access door 112 that is held in place by a pair of fasteners 114. The access door 112 permits observation of the operation of the dual feed path livestock feed system 94 and permits manual cleaning, unclogging, and repair of the first boot unloader 100.

FIG. 5B illustrates a second boot unloader 116 as part of the dual feed path livestock feed system 94 of FIG. 5A. Like the first boot unloader 100, the second boot unloader 116 has many of the same features as the second boot unloader 52 illustrated in FIG. 2. Similar to the first boot unloader 100 of FIG. 5A, however, the second boot unloader 116 is part of two feed paths 96, 98, which extend through the second boot unloader 116. Each parallel feed path 96, 98 originates from the first boot unloader 100 at one end of the second boot unloader 116, and extends toward at least one feed outlet (not shown) from the other end. The second boot unloader 116 in this embodiment includes an access door (not shown), similar to the access door 112 of the first boot unloader 100. With the access door of the second boot unloader 116 removed, an access 118 permits observation of the operation of an auger 120 and a core system 122. A feed door assembly 124 and a feed door (not shown) are in the closed position in FIG. 5B, which allows the access door 112 of FIG. 5A to be removed without excess feed 126 spilling from the second boot unloader 116. In this embodiment, the drive system (not shown) located at the end of each respective feed path 96, 98 moves the feed 126 along the feed paths 96, 98 in the A direction toward the at least one feed outlet (not shown) by rotating its respective auger 120 in the B direction about an axis defined by the A direction. This in turn causes the auger 120 to push the feed 126 in the A direction. The core system 122 can also be observed to prevent an excessive amount of feed 126 from entering the feed paths 96, 98 in the A direction.

Figure 6A:
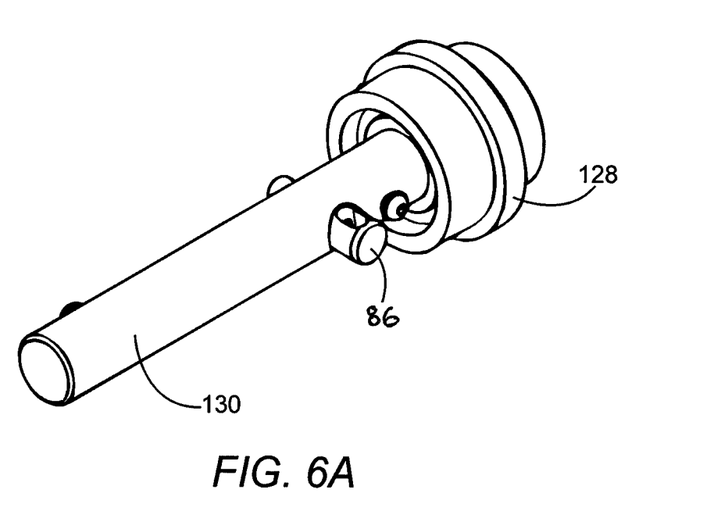
FIG. 6A illustrates a portion of a core system and an end bearing according to one embodiment.
Figure 6B:
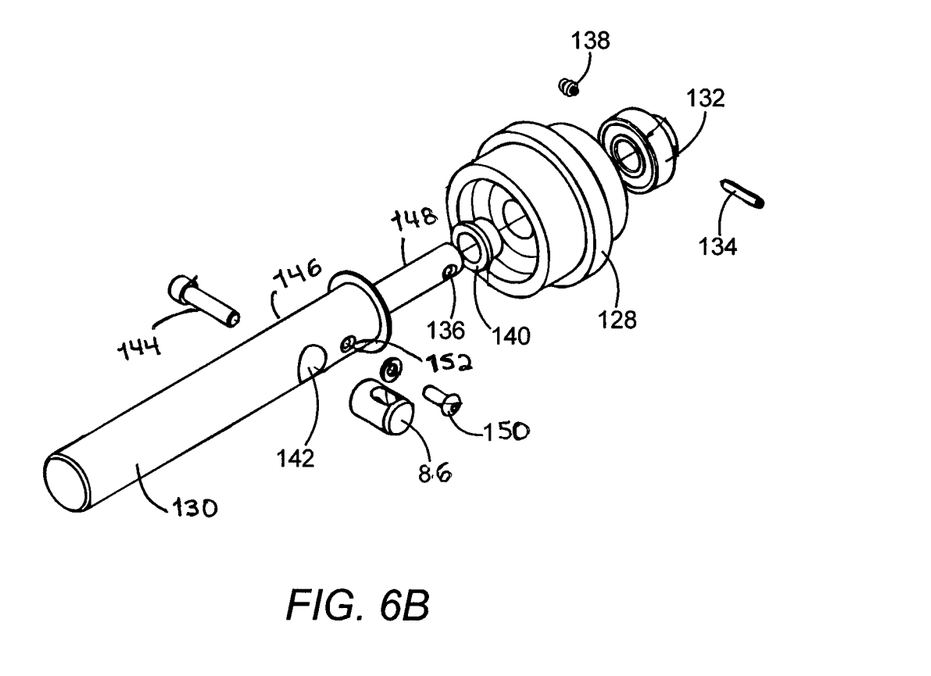
FIG. 6B illustrates an exploded view of the core system and the end bearing of FIG. 6A.
Figure 6C:
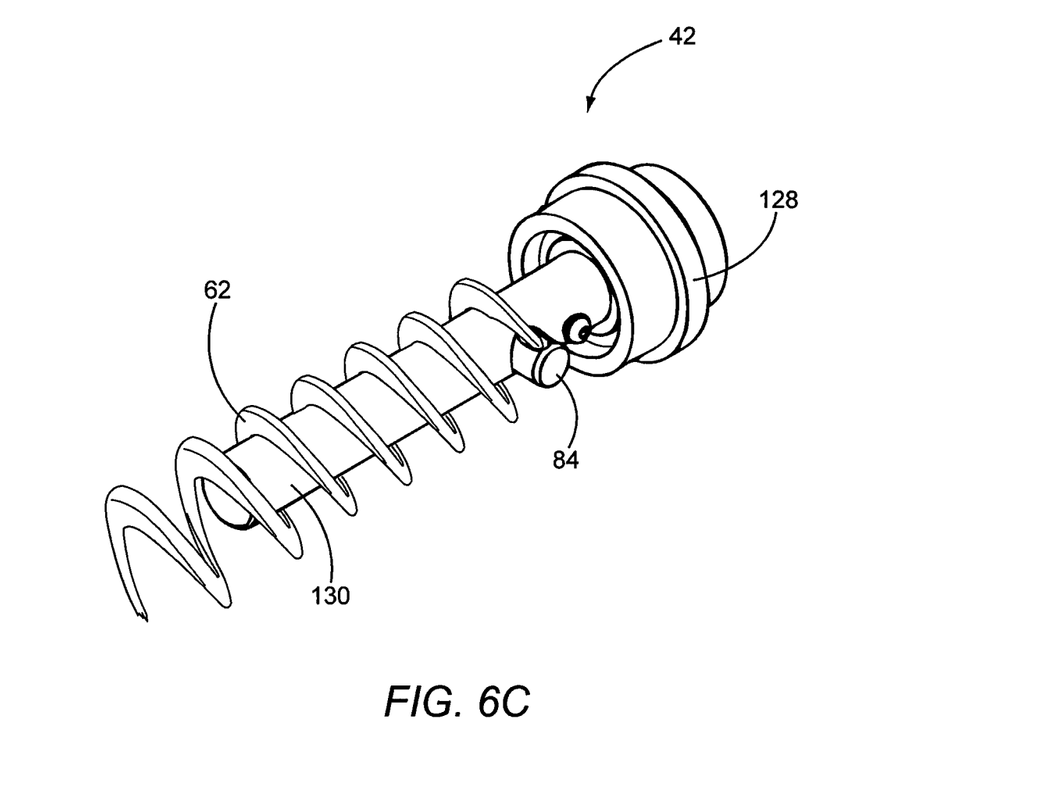
FIG. 6C illustrates the core system and the end bearing of FIG. 6A connected to an auger according to one embodiment.

FIGS. 6A-6C illustrate the connection between an auger 62, a core system 82, and a bearing assembly 42 according to one embodiment. FIG. 6A illustrates a portion of the core system 82 of FIGS. 2 and 3, and elements of the end bearing 42 for securing the core system 82 in the feed path 40. FIG. 6B illustrates an exploded view of the core system 82 and the end bearing 42 of FIG. 6A. The end bearing 42 primarily includes a bearing housing 128, an adapter tube 130, and a race bearing 132.

The bearing housing 128 is configured to be secured to the end of the feed path 40. The race bearing 132 is configured to mate with the bearing housing 128 and is able to rotate freely with respect to the bearing housing 128. The adapter tube 130 is configured to extend through the bearing housing 128 and the race bearing 132, and is further secured to the race bearing 132, for example with a pin 134, which mates with a first recess 136 in the adapter tube 130 and is held in place by a screw 138. In this embodiment, a bushing 140 is disposed between the adapter tube 130 and the bearing housing 128 to allow the adapter tube 130 to more smoothly rotate with respect to the bearing housing 128. The adapter tube 130 can be adapted to be secured to the first core section 88 of the core system 82 and can alternatively be integrally formed with the first core section 88. The adapter tube 130 also includes a second recess 142 for the auger lock 86 and an auger lock screw 144. The auger lock 86 is adapted to clamp the auger 62 to the adapter tube 130 by tightening the auger lock screw 144, as shown in FIG. 6C. When the auger 62 is locked to the adapter tube 130, rotation of the auger 62, such as via the drive assembly 64, rotates the adapter tube 130 in the end bearing 42, and in turn rotates the core system 82 with the auger 62. In this embodiment, adapter tube 130 may also be disassembled into a first adapter tube section 146 and a second adapter tube section 148. In this embodiment, the first adapter tube section 146 and the second adapter tube section 148 are connected via a connection pin 150 secured via a first additional recess 152 in the first adapter tube section 146 and a second additional recess (not shown) in the second adapter tube section 148. In another embodiment, without being limiting, the adapter tube 130 may be formed as one piece.

Many modifications and other embodiments of the embodiments set forth herein will come to mind to one skilled in the art to which the embodiments pertain having the benefit of the teachings presented in the foregoing descriptions and the associated drawings. Therefore, it is to be understood that the description and claims are not to be limited to the specific embodiments disclosed and that modifications and other embodiments are intended to be included within the scope of the appended claims. It is intended that the embodiments cover the modifications and variations of the embodiments provided that come within the scope of the appended claims and their equivalents. Although specific terms are employed herein, they are used in a generic and descriptive sense only and not for purposes of limitation.

We claim:

1. A livestock feed system, comprising:
 a feed path extending between an end bearing and at least one feed outlet;
 a first feed boot unloader disposed in the feed path between the end bearing and the at least one feed outlet, the first feed boot unloader being configured to receive first feed from a first feed housing into the feed path;
 a second feed boot unloader disposed in the feed path between the first feed boot unloader and the at least one feed outlet, the second feed boot unloader being configured to receive second feed from a second feed housing into the feed path;
 an auger extending continuously in the feed path between the first feed boot unloader and the at least one feed outlet, the auger configured to be rotated to move the first feed in the feed path toward the at least one feed outlet and move the second feed in the feed path toward the at least one feed outlet; and
 a core system disposed within the auger substantially along an axis of rotation of the auger through at least the first feed boot unloader in the feed path and the second feed boot unloader in the feed path, the core system being configured to limit an amount of the first feed received into the feed path and to limit an amount of the second feed received into the feed path, wherein the core system terminates a first distance beyond the second feed boot unloader in the feed path and the auger terminates a second distance beyond the second feed boot unloader in the feed path, wherein the second distance is greater than the first distance.

2. The livestock feed system of claim 1, wherein the core system is comprised of a single continuous core extending through the first feed boot unloader and the second feed boot unloader.

3. The livestock feed system of claim 1, wherein the core system is comprised of a first core extending through the first feed boot unloader, and a second core extending through the second feed boot unloader.

4. The livestock feed system of claim 3, wherein the first core terminates a first distance beyond the first feed boot unloader in the feed path, and the second core terminates a second distance beyond the second feed boot unloader in the feed path.

5. The livestock feed system of claim 1, wherein the core system is comprised of a non-flexible material.

6. The livestock feed system of claim 1, wherein the core system is comprised of a flexible material.

7. The livestock feed system of claim 1, wherein the core system is comprised of a plastic material.

8. The livestock feed system of claim 1, wherein the core system is comprised of a metal material.

9. The livestock feed system of claim 1, wherein:
the feed path is a first feed path;
the end bearing is a first end bearing;
the at least one feed outlet comprises at least one first feed outlet;
the auger is a first auger;
the core system is a first core system; and
the livestock feed system further comprises:
 a second feed path extending between a second end bearing and at least one second feed outlet, wherein:
  the first feed boot unloader is disposed in the second feed path between the second end bearing and the at least one second feed outlet, the first feed boot unloader being configured to receive the first feed from the first feed housing into the second feed path; and
  the second feed boot unloader is disposed in the second feed path between the first feed boot unloader and the at least one second feed outlet, the second feed boot unloader being configured to receive the second feed from the second feed housing into the second feed path;
 a second auger extending continuously in the second feed path between the first feed boot unloader and the at least one second feed outlet, the second auger configured to be rotated to move the first feed in the first feed path toward the at least one second feed outlet and move the second feed in the second feed path toward the at least one second feed outlet; and
 a second core system disposed within the second auger substantially along an axis of rotation of the second auger through at least the first feed boot unloader in the first feed path and the second feed boot unloader in the second feed path, the second core system being configured to limit the amount of the first feed received into the first feed path and to limit the amount of the second feed received into the second feed path.

10. The livestock feed system of claim 9, wherein the first core system and the second core system are substantially parallel to each other.

11. The livestock feed system of claim 9, wherein
at least a portion of the first core system disposed in the first boot unloader is parallel to at least a portion of the second core system disposed in the first boot unloader; and
at least a portion of the first core system disposed in the second boot unloader is parallel to at least a portion of the second core system disposed in the second boot unloader.

12. The livestock feed system of claim 1, further comprising a motor configured to rotate the auger to move the first feed in the feed path toward the at least one feed outlet and move the second feed in the feed path toward the at least one feed outlet.

13. The livestock feed system of claim 12, wherein the motor is operationally connected to an end of the auger at a location proximate to the at least one feed outlet.

14. The livestock feed system of claim 12, further comprising at least one sensor associated with the at least one feed outlet, wherein the at least one sensor is configured to:
detect a low feed condition with respect to at least one feed receptacle associated with the at least one feed outlet; and
activate the motor in response to detecting the low feed condition.

15. The livestock feed system of claim 1, wherein the auger is connected to the core system such that the auger and the core system rotate together.

* * * * *